(12) United States Patent
Adedeji et al.

(10) Patent No.: US 7,273,014 B2
(45) Date of Patent: *Sep. 25, 2007

(54) HIGH PERFORMANCE PLASTIC PALLETS

(75) Inventors: Adeyinka Adedeji, Albany, NY (US); Geoffrey Henry Riding, Castleton, NY (US); Bruce Marshall Torrey, Pittsfield, MA (US)

(73) Assignee: General Electric Company, Schenectady, NY (US)

( * ) Notice: Subject to any disclaimer, the term of this patent is extended or adjusted under 35 U.S.C. 154(b) by 318 days.

This patent is subject to a terminal disclaimer.

(21) Appl. No.: 10/771,784

(22) Filed: Feb. 4, 2004

(65) Prior Publication Data

US 2005/0004281 A1 Jan. 6, 2005

Related U.S. Application Data

(63) Continuation of application No. 09/167,286, filed on Oct. 7, 1998, now Pat. No. 6,784,234.

(51) Int. Cl.
*B65D 19/32* (2006.01)

(52) U.S. Cl. .................. 108/901; 108/57.28; 108/902; 524/127; 524/140; 524/141; 524/145

(58) Field of Classification Search ............... 524/127, 524/140–141, 145; 108/901–902, 57.28
See application file for complete search history.

(56) References Cited

U.S. PATENT DOCUMENTS

| | | | |
|---|---|---|---|
| 2,877,204 A | 3/1959 | Dunncack et al. |
| 2,933,480 A | 4/1960 | Gresham et al. |
| 3,089,192 A | 5/1963 | Adams |
| 3,093,621 A | 6/1963 | Gladding |
| 3,169,121 A | 2/1965 | Goldberg |
| 3,211,709 A | 10/1965 | Adamek et al. |
| 3,268,636 A | 8/1966 | Angell, Jr. |
| 3,331,336 A | 7/1967 | Schulde et al. |
| 3,405,666 A | 10/1968 | Miller |
| 3,436,446 A | 4/1969 | Angell, Jr. |
| 3,610,173 A | 10/1971 | McIlwraith et al. |
| 3,639,506 A | 2/1972 | Haaf |
| 3,646,168 A | 2/1972 | Barrett |
| 3,664,271 A | 5/1972 | Wolder et al. |
| 3,707,127 A | 12/1972 | Palfey |
| 3,750,596 A | 8/1973 | Box |
| 3,761,541 A | 9/1973 | Katchman et al. |
| 3,790,519 A | 2/1974 | Wahlborg |
| 3,803,085 A | 4/1974 | Takekoshi et al. |
| 3,814,031 A | 6/1974 | Fowler |
| 3,814,869 A | 6/1974 | DeLuca |
| 3,824,933 A | 7/1974 | Lind |
| 3,847,867 A | 11/1974 | Heath |
| 3,847,869 A | 11/1974 | Williams, III |
| 3,850,885 A | 11/1974 | Takekoshi et al. |
| 3,852,242 A | 12/1974 | White |
| 3,855,178 A | 12/1974 | White et al. |
| 3,894,999 A | 7/1975 | Boozer et al. |
| 3,905,942 A | 9/1975 | Takekoshi et al. |
| 3,940,467 A | 2/1976 | Brachman |
| 3,951,078 A | 4/1976 | Fowler et al. |
| 3,972,902 A | 8/1976 | Heath et al. |
| 3,983,093 A | 9/1976 | Williams, III et al. |
| 3,987,009 A | 10/1976 | Young |
| 4,007,694 A | 2/1977 | Fowler et al. |
| 4,051,787 A | 10/1977 | Nishitani et al. |
| D246,296 S | 11/1977 | Fuji et al. |
| 4,059,654 A | 11/1977 | Von Bodungen et al. |
| 4,154,775 A | 5/1979 | Axelrod |
| 4,155,969 A | 5/1979 | Hendry |
| 4,166,055 A | 8/1979 | Lee, Jr. |
| 4,191,685 A | 3/1980 | Haaf et al. |
| 4,243,629 A | 1/1981 | Tramezzani |
| 4,252,913 A | 2/1981 | Katchman et al. |
| 4,254,775 A | 3/1981 | Langer |
| 4,355,126 A | 10/1982 | Haaf et al. |
| 4,375,265 A | 3/1983 | van de Wetering et al. |
| 4,390,477 A | 6/1983 | Axelrod |
| 4,397,246 A | 8/1983 | Ishida et al. |
| 4,410,651 A | 10/1983 | Haaf et al. |

(Continued)

FOREIGN PATENT DOCUMENTS

EP 0407097 1/1991

(Continued)

OTHER PUBLICATIONS

JP 05096587 Japanese abstract Apr. 20, 1993.

(Continued)

*Primary Examiner*—Peter Szekely
(74) *Attorney, Agent, or Firm*—Cantor Colburn LLP

(57) ABSTRACT

The invention relates to plastic pallets that pass the Underwriters Laboratory UL 2335 protocol for pallets wherein said pallets comprises at least one resin selected from the group consisting of:
(a) polyphenylene ether resin and blends containing polyphenylene ether resin,
(b) polycarbonate resin and blends containing polycarbonate resin,
(c) vinyl aromatic graft copolymer resin;
(d) polyetherimide resin and blends containing polyetherimide resin, and
(e) thermosetting resins.

In a preferred embodiment, the plastic pallet has an open deck design. The invention also relates to a method to make pallets that pass the UL 2335 protocol.

14 Claims, No Drawings

U.S. PATENT DOCUMENTS

| | | | |
|---|---|---|---|
| 4,442,251 A * | 4/1984 | Haaf et al. ............... | 524/141 |
| 4,455,410 A | 6/1984 | Giles, Jr. | |
| 4,487,896 A | 12/1984 | Mark et al. | |
| 4,504,613 A * | 3/1985 | Abolins et al. ............ | 524/125 |
| 4,521,487 A | 6/1985 | Mitsuno et al. | |
| 4,535,106 A | 8/1985 | Abolins et al. | |
| 4,584,332 A | 4/1986 | Talley et al. | |
| 4,584,334 A | 4/1986 | Lee, Jr. et al. | |
| 4,692,490 A | 9/1987 | Abolins | |
| 4,749,536 A | 6/1988 | Farrell | |
| D296,599 S | 7/1988 | Bean | |
| 4,757,107 A | 7/1988 | Yeager et al. | |
| 4,942,206 A | 7/1990 | White et al. | |
| D315,240 S | 3/1991 | Sahm, Jr. | |
| 5,008,314 A * | 4/1991 | Lee, Jr. .................... | 524/143 |
| 5,122,575 A | 6/1992 | White et al. | |
| 5,130,076 A | 7/1992 | Blatz et al. | |
| 5,157,065 A | 10/1992 | Fuhr et al. | |
| 5,165,990 A | 11/1992 | Nakano | |
| 5,198,170 A | 3/1993 | Hawrylko | |
| 5,219,512 A | 6/1993 | Tsutsumi | |
| 5,231,146 A | 7/1993 | Brown et al. | |
| 5,237,005 A | 8/1993 | Yates, III | |
| 5,271,889 A | 12/1993 | Weinrotter et al. | |
| 5,275,776 A | 1/1994 | Hara et al. | |
| 5,283,313 A | 2/1994 | Yamashita et al. | |
| 5,290,881 A | 3/1994 | Dekkers | |
| 5,334,636 A | 8/1994 | Fuji et al. | |
| 5,412,024 A * | 5/1995 | Okada et al. ............. | 524/577 |
| 5,424,020 A | 6/1995 | Hara et al. | |
| 5,440,998 A | 8/1995 | Morgan, IV et al. | |
| 5,461,096 A | 10/1995 | Bopp et al. | |
| 5,461,138 A | 10/1995 | Serafini et al. | |
| 5,492,069 A | 2/1996 | Alexander et al. | |
| 5,505,141 A | 4/1996 | Barber | |
| 5,520,121 A | 5/1996 | Schubart et al. | |
| 5,527,585 A | 6/1996 | Needham et al. | |
| 5,579,701 A | 12/1996 | Fook Wah | |
| 5,596,933 A | 1/1997 | Knight et al. | |
| 5,685,233 A | 11/1997 | DeJean | |
| 5,687,932 A | 11/1997 | Gomes | |
| 5,859,130 A | 1/1999 | Gianchandai et al. | |
| 5,916,970 A | 6/1999 | Lee, Jr. et al. | |
| 5,968,429 A | 10/1999 | Treece et al. | |
| 5,980,797 A | 11/1999 | Shelby et al. | |
| 5,981,656 A | 11/1999 | McGaughan et al. | |
| 6,241,932 B1 | 6/2001 | Choi et al. | |
| 6,388,046 B1 | 5/2002 | Campbell et al. | |
| 6,448,307 B1 | 9/2002 | Medoff et al. | |
| 6,468,464 B1 | 10/2002 | Eckardt et al. | |
| 6,815,476 B1 | 11/2004 | Bhatia et al. | |

FOREIGN PATENT DOCUMENTS

| | | |
|---|---|---|
| EP | 0747427 | 12/1996 |
| FR | 1412075 | 10/1964 |
| GB | 2043083 | 10/1980 |

OTHER PUBLICATIONS

JP 05337993 Japanese abstract Dec. 21, 1993.
www.kwpc.com/kwpc/markets/directex(3,5,6 and overview). Html Apr. 11, 2000.

* cited by examiner

HIGH PERFORMANCE PLASTIC PALLETS

CROSS-REFERENCE TO RELATED APPLICATIONS

This application is a continuation of application Ser. No. 09/167,286 filed Oct. 7, 1998 now U.S. Pat. No. 6,748,234.

FEDERALLY SPONSORED RESEARCH

Not applicable.

BACKGROUND OF THE INVENTION

1. Field of the Invention

The invention relates to a plastic pallet that passes the Underwriters Laboratory UL 2335 protocol for pallets wherein said pallet comprises at least one resin selected from the group consisting of:
 (a) polyphenylene ether resin and blends containing polyphenylene ether resin,
 (b) polycarbonate resin and blends containing polycarbonate resin,
 (c) vinyl aromatic graft copolymers;
 (d) polyetherimide resin and blends containing polyetherimide resin, and
 (e) thermosetting resins.

In a preferred embodiment, the plastic pallet has an open deck design. In another preferred embodiment, the pallet comprises at least one resin that contains a flame retardant.

2. Brief Description of the Related Art

There are many types of plastic pallets which are widely being used throughout the world to facilitate shipment and transportation of goods. The purpose of the pallet is to provide a support for the cargo particularly during shipment and storage and there has been an increasing requirement for such pallets to become more sophisticated due to varying standards and demands.

Conventionally pallets have been formed of timber, however, these pallets have suffered several disadvantages due to the inherent characteristics of wood. Such wooden pallets are naturally heavy, bulky, and expensive because of the nature of the material used in their construction. In addition, wooden pallets suffer deterioration due to inclement weather conditions and can suffer damages as a result of water which may be present in the location in which they are being used. The presence of such water results in the rotting of the timber and resultant weakening of the structure of the pallet. Furthermore such pallets are generally held together by means of gluing using suitable adhesives and/or nails or staples which are formed of metal. These methods of fixing of the components of the pallets together can also suffer as a result of the inclement conditions the pallet is required to undergo as a result of deterioration of the adhesive and/or corrosion of the nails or staples. Furthermore such pallets can be the subject of insect infestation which can result in the deterioration of the pallet but also can result in the introduction of undesirable infestations of insects from one location to another.

With improved quality control the difficulties created by utilization of wooden pallets have rendered such pallets as being generally undesirable and has resulted in the need for pallets of a higher standard.

Plastic pallets have been proposed as an alternative to wooden pallets, however, such plastic pallets generally flow during fires spreading molten plastic and generating dangerously high levels of heat. Because of these increased risks, the use and storage of plastic pallets has been more stringently regulated by National Fire Protection Association (NFPA 231 and NFPA 231C) and Factory Mutual than wood pallets. The more stringent regulations for plastic pallets, both for commodity storage and idle pallet storage, has diminished their utility. For example, plastic pallets require a one level increase in the class level for commodity storage and must be stored either outside or in a detached structure for idle pallet storage.

Recent changes to NFPA 231 and NFPA 231C allow for plastic pallets to be regulated the same as wood pallets when experimental data show equivalency in the burning and suppression characteristics between the plastic and wood pallets and the pallets are listed for such equivalency. The changed protocols provide that specific test data will take precedence for determining classification of commodities. It is believed that prior to the present invention, no pallet made from a plastic composition has met this equivalency.

SUMMARY OF THE INVENTION

The needs discussed above have been generally satisfied by the discovery of plastic pallets that pass the Underwriters Laboratory UL 2335 protocol for pallets wherein said pallets comprise at least one resin selected from the group consisting of:
 (a) polyphenylene ether resin and blends containing polyphenylene ether resin,
 (b) polycarbonate resin and blends containing polycarbonate resin,
 (c) vinyl aromatic graft copolymers;
 (d) polyetherimide resin and blends containing polyetherimide resin, and
 (e) thermosetting resins.

In a preferred embodiment, the plastic pallet has an open deck design. In another preferred embodiment, the pallet comprises at least one resin that contains a flame retardant.

The description which follows provides further details regarding this invention.

DESCRIPTION OF THE DRAWINGS

Not applicable.

DETAILED DESCRIPTION OF THE INVENTION

There are generally two types of pallets: block pallets and stringer pallets. The stringer pallets are generally made of wood laid up with, generally, 2"×4"×48" long studs in a horizontal mode with the 4" dimension being perpendicular to the top of the pallet. Slats or stringers are attached on top of the 2"×4" in a direction opposite or transverse to the direction of the 2"×4". Block pallets are made up of blocks placed between the top and bottom planar decks or plates. The decks may be solid or may contain openings or holes therein. In a preferred embodiment, at least one deck contains openings or holes in the deck. When the pallet contains both a top deck and a bottom deck, it is preferred that both decks contain openings or holes in the decks.

The specifications for pallets as established by the Grocery Manufacturing Association requirements are that a pallet be exactly 48"×40"; have true 4-way entry; accommodate pallet jacks; have a smooth, non-skid, top load bearing surface having at least 85% coverage and should be flat; a bottom loading surface and have cut-outs for pallet jack wheels from four (4) sides; rackable from 48" and 40"

dimension; must be recyclable; desired weight under 50 pounds; have a load capacity of 2,800 pounds; capable of bearing 2,800 pound loads safely in stacks of 5 loads high racking; and weather and moisture resistant. In a preferred embodiment, the pallets of the present invention meet the Grocery Manufacturing Association requirements.

Suitable pallet designs include all pallots known in the art including, for example, designs disclosed in U.S. Design Pat. Nos. 246,296, 296,599, and 315,240, in addition to U.S. Pat. Nos. 3,331,336, 3,405,666, 3,610,173, 3,664,271, 3,750,596, 3,824,933, 5,505,141, 5,520,121, 5,527,585, and commonly owned application Ser. No. 09/087,175, now abandoned.

Descriptions of useful resins for the practice of the present invention are provided as follows.

Polyphenylene Ether Resin and Blends Containing Polyphenylene Ether Resin.

Polyphenylene ether resin, hereinafter "PPE", per se, are known polymers comprising a plurality of structural units of the formula (I):

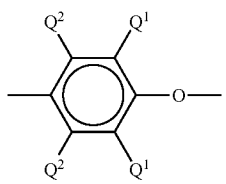

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains to produce a higher molecular weight polymer.

It will be apparent to those skilled in the art from the foregoing that the PPE contemplated for use in the present invention include all those presently known, irrespective of variations in structural units or ancillary chemical features.

The PPE resin compositions of the present invention preferably contain at least one elastomeric or nonelastomeric polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula (II):

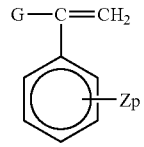

wherein G is hydrogen, lower alkyl or halogen; z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, u-methylstyrene, ethylvinylbenzene, divinylbenzene and maleic anhydride, and rubber-modified polystyrenes comprising blends and grafts, wherein the rubber is a polybutadiene or a rubbery copolymer of about 98-68% styrene and about 2-32% diene monomer. These rubber modified polystyrenes include high impact polystyrene (commonly referred to as HIPS). Non-elastomeric block copolymer compositions of styrene and butadiene can also be used that have linear block, radial block or tapered block copolymer architectures. They are commercially available from such companies as Fina Oil as under the trademark FINACLEAR and Phillips under the trademark K-RESINS.

The amount of the polymer of a nonelastomeric alkenylaromatic compound, when one is used, is an amount effective to improve the flow and processability of the composition. Improved flow can be indicated by reduced viscosity or reduced injection pressures needed to fill a part during an injection molding process. Generally, the nonelastomeric alkenylaromatic compound is utilized in the range of about 20% to about 60% by weight based on the total weight of the composition. The preferred range is about 30% to about 60% by weight; based on the total weight of the composition.

The compositions of the present invention may also contain at least one impact modifier. The impact modifier may be used alone or in combination with a nonelastomeric alkenylaromatic compound. The impact modifiers include block (typically diblock, triblock or radial teleblock) copolymers of alkenyl aromatic compounds and dienes. Most often at least one block is derived from styrene and at least one block from at least one of butadiene and isoprene. Especially preferred are the triblock and diblock copolymers comprising polystyrene blocks and diene derived blocks wherein the aliphatic unsaturation has been preferentially removed with hydrogenation. Mixtures of various copolymers are also sometimes useful. The weight average molecular weights of the impact modifiers are typically in the range of about 50,000 to 300,000. Block copolymers of this type are available commercially from a number of sources, including Phillips Petroleum under the trademark SOLPRENE, Shell Chemical Co. under the trademark KRATON, and Kuraray under the trademark SEPTON.

Various mixtures of the aforementioned impact modifiers are also sometimes useful. The amount of the impact modifier generally present, when one is used, is an amount effective to improve the physical properties, for example, the ductility of the composition when compared to the same composition without an impact modifier. Improved ductility can be indicated by increased impact strength, increased tensile elongation to break, or both increased impact strength and increased tensile elongation to break. Generally, the impact modifier is utilized in the range of about 1% to about 20% by weight based on the total weight of the composition. A preferred range is about 1% to about 8% by weight; based on the total weight of the composition. The exact amount and types or combinations of impact modifiers utilized will depend in part on the requirements needed in the final blend composition.

Polycarbonate Resin and Blends Containing Polycarbonate Resin

Suitable aromatic carbonate resins include aromatic polycarbonate resins or aromatic copolyester-carbonate resins.

Aromatic polycarbonate resins are known compounds and the properties and methods of making polycarbonate resins are also known. Typically these are prepared by reacting a dihydric phenol with a carbonate precursor, such as phosgene, a haloformate or a carbonate ester and generally in the presence of an acid acceptor and a molecular weight regulator. Generally speaking, such carbonate polymers may be typified as possessing recurring structural units of the formula (III):

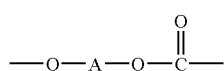

(III)

wherein A is a divalent aromatic radical of the dihydric phenol employed in the polymer reaction. The dihydric phenol which may be employed to provide such aromatic carbonate polymers are mononuclear or polynuclear aromatic compounds, containing as functional groups two hydroxy radicals, each of which maybe attached directly to a carbon atom of an aromatic nucleus. Typical dihydric phenols are: 2,2-bis(4-hydroxyphenyl)propane; hydroquinone; resorcinol; 2,2-bis(4-hydroxyphenyl)pentane; 2,4'-(dihydroxydiphenyl)methane; bis(2-hydroxyphenyl)methane; bis(4-hydroxyphenyl)methane; 1,1-bis(4-hydroxyphenyl)-3,3,5-trimethylcyclohexane; fluorenone bisphenol, 1,1-bis(4-hydroxyphenyl)ethane; 3,3-bis(4-hydroxyphenyl)pentane; 2,2'-dihydroxydiphenyl; 2,6-dihydroxynaphthalene; bis(4-hydroxydiphenyl)sulfone; bis(3,5-diethyl-4-hydroxyphenyl)sulfone; 2,2-bis(3,5-dibromo-4-hydroxyphenyl)propane; 2,2-bis(3,5-dimethy-4-hydroxyphenyl)propane; 2,4'-dihydroxydiphenyl sulfone; 5'-chloro-2,4'-dihydroxydiphenyl sulfone; 4,4'-dihydroxydiphenyl ether; 4,4'-dihydroxy-3,3'-dichlorodiphenyl ether, spiro biindane bis phenol, and the like.

These aromatic polycarbonates can be manufactured by known processes, such as, for example and as mentioned above, by reacting a dihydric phenol with a carbonate precursor, such as phosgene, in accordance with methods set forth in the literature including the melt polymerization process. Generally in the melt polymerization process, a diphenyl carbonate is reacted with a bisphenol.

The carbonate precursor employed in preparing the polycarbonate of this invention can be either carbonyl halide or a haloformate. The carbonyl halides which can be employed herein are, for example carbonyl bromide, carbonyl chloride, etc.; or mixtures thereof. The haloformates suitable for use herein include bishaloformates of dihydric phenols (bischloroformates of bis phenol A, hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene is preferred.

The reaction disclosed above is preferably known as an interfacial reaction between the dihydric compound and a carbonyl chloride such as phosgene. Another process for preparing the aromatic polycarbonate employed in this invention is the transesterification process which involves the transesterification of an aromatic dihydroxy compound and a diester carbonate. This process is known as the melt polymerization process. In the practice of this invention, the process of producing the aromatic polycarbonate is not critical. As used herein, aromatic carbonate polymer shall mean and include any of the aromatic polycarbonates, blends thereof with other polymer, copolymers thereof, copolyester carbonates, and mixtures thereof.

It is also possible to employ two or more different dihydric phenols or a copolymer of a dihydric phenol with a glycol or with a hydroxy- or acid-terminated polyester or with a dibasic acid or hydroxy acid in the event a carbonate copolymer or interpolymer rather than a homopolymer is desired for use in the preparation of the polycarbonate mixtures of the invention. Polyarylates and polyester-carbonate resins or their blends can also be employed. Branched polycarbonates are also useful and are well disclosed in the literature. Also, blends of linear polycarbonate and a branched polycarbonate can be utilized herein. Moreover, blends of any of the above materials may be employed in the practice of this invention to provide the aromatic polycarbonate component of the carbonate polymer composition.

In any event, the preferred aromatic polycarbonate for use in the practice in the present invention is a homopolymer, for example, a homopolymer derived from 2,2-bis(4-hydroxyphenyl)propane (bisphenol-A) and phosgene, and is commercially available.

The aromatic carbonate polymers also suitable for use in this invention include polyester-carbonates, also known as copolyester-polycarbonates, that is, resins which contain, in addition to recurring polycarbonate chain units of the formula (IV):

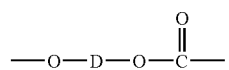

(IV)

wherein D is a divalent aromatic radical of the dihydric phenol employed in the polymerization reaction, repeating or recurring carboxylate units, for example of the formula (V):

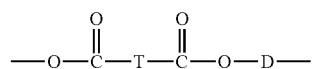

(V)

wherein D is a defined above and T is an aromatic radical such as phenylene, naphthylene, biphenylene, substituted phenylene and the like; a divalent alipathic-aromatic hydrocarbon radical such as an alkaryl or alkaryl radical; or two or more aromatic groups connected through such aromatic linkages which are known in the art.

The copolyester-polycarbonate resins are also prepared by interfacial polymerization technique, well known to those skilled in the art (see, for example, U.S. Pat. Nos. 3,169,121 and 4,487,896).

In general, any dicarboxylic acid conventionally used in the preparation of linear polyesters may be utilized in the preparation of the copolyester carbonate resins of the instant invention. Generally, the dicarboxylic acids which may be utilized include the aliphatic dicarboxylic acids, the aromatic dicarboxylic acids, and the alipaticaromatic dicarboxylic acids. These acids are well known and are disclosed, for example, in U.S. Pat. No. 3,169,121. Mixtures of dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9:8.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The aromatic polycarbonate resins may be linear or branched and, generally, will have a weight average molecular weight of from about 10,000 to about 200,000 grams per mole ("g/mol"), preferably from about 20,000 to about 100,000 g/mol, as measured by gel permeation chromatography. Such resins typically exhibit an intrinsic viscosity, as determined in chloroform at 25° C. of from about 0.3 to about 1.5 deciliters per gram (dl/gm), preferably from about 0.45 to about 1.0 dl/gm.

The branched polycarbonates may be prepared by adding a branching agent during polymerization. These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid and benzophenone tetracarboxylic acid. The branching agent may be added at a level of about 0.05-2.0 weight percent.

All types of polycarbonates end groups are contemplated as being within the scope of the present invention with respect to the polycarbonate component of a carbonate polymer composition.

The thermoplastic resin component of the composition of the present invention may, optionally, further comprise one or more other thermoplastic resins in addition to the aromatic carbonate resin, such as, for example, polyphenylene ether resins, vinyl aromatic graft copolymers resins, styrenic resins, polyester resins, polyamide resins, polyesteramide resins, polysulfone resins, polyimide resins, and polyetherimide resins.

In a preferred embodiment, the composition of the present invention comprises an aromatic polycarbonate resin and a vinyl aromatic graft copolymer.

In another preferred embodiment, the thermoplastic resin component of the composition of the present invention comprises, based on the total weight of the thermoplastic resin component, from 30% to 99% by weight, more preferably from 50 to 95 pbw and still more preferably from 60% to 90% by weight of an aromatic polycarbonate resin and from 1% to 70% by weight, more preferably from 50% to 95% by weight and still more preferably from 10% to 40% by weight of a vinyl aromatic graft copolymer defined as follows.

Vinyl Aromatic Graft Copolymer Resin

Suitable vinyl aromatic graft copolymers comprise (i) a rubber modified monovinylidene aromatic graft copolymer component and (ii) an ungrafted rigid copolymer component, and are generally prepared by graft polymerization of a mixture of a monovinylidene aromatic monomer and one or more comonomers in the presence of one or more rubbery polymeric substrates. Preferred vinyl aromatic graft copolymers include: acrylonitrile-butadiene-styrene (ABS), acrylonitrile-styrene-butyl acrylate (ASA), methylmethacrylate-acrylonitrile-butadiene styrene (MABS), and acrylonitrile-ethylene-propylene-non-conjugated diene-styrene (AES). An especially preferred vinyl aromatic graft copolymers is acrylonitrile-butadiene-styrene (ABS).

Depending on the amount of rubber present, a separate matrix or continuous rigid phase of ungrafted rigid (co)polymer may be simultaneously obtained along with the rubber modified monovinylidene aromatic graft polymer. The resins may also be produced by blending a rigid monovinylidene aromatic copolymer with one or more rubber modified monovinylidene aromatic graft copolymers. Typically, the rubber modified resins comprise the rubber modified graft copolymer at a level of from about 5% to 100% by weight, based on the total weight of the resin, preferably from about 10% to about 90% thereof, and more preferably about 30% to 80% by weight thereof. The rubber modified resin comprises the ungrafted rigid polymer at a level of from about 95% to about 0% by weight, based on the total weight of the resin, preferably from about 90% to 10% by weight thereof, and more preferably from about 70% to about 20% by weight thereof.

Monovinylidene aromatic monomers which may be employed include styrene, a-methyl styrene, halostyrenes, that is, dibromostyrene, mono or di alkyl, alkoxy or hydroxy substitute groups on the nuclear ring of the monovinylidene aromatic monomer, that is, vinyl toluene, vinylxylene, butylstyrene, parahydroxystyrene or methoxystyrene or mixtures thereof. The monovinylidene aromatic monomers utilized are generically described by the following formula (VI):

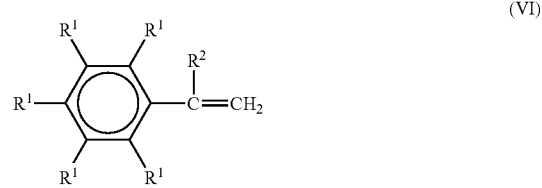

(VI)

wherein each $R^1$ is independently H, $(C_1$-$C_6)$alkyl, cycloalkyl, aryl, alkaryl, aralkyl, alkoxy, aryloxy, or halo, such as, for example, such as bromine and chlorine, and $R_2$ is selected from the group consisting of H, $(C_1$-$C_6)$alkyl and halo. As used herein, the notation "$(C_x$-$C_y)$" in reference to an organic moiety means that the organic moiety contains from x carbons to y carbons. Examples of substituted vinylaromatic compounds include styrene, 4-methylstyrene, 3,5-diethylstyrene, 4-n-propylstyrene, a-methylstyrene, a-methyl vinyltoluene, a-chlorostyrene, a-bromostyrene, dichlorostyrene, dibromostyrene, tetrachlorostyrene, mixtures thereof and the like. The preferred monovinylidene aromatic monomers used are styrene and/or a-methylstyrene.

Comonomers which may be used with the monovinylidene aromatic monomer includes acrylonitrile, methacrylonitrile, $(C_1$-$C_8)$alkyl or aryl substituted acrylate, $(C_1$-$C_8)$alkyl, aryl or haloaryl substituted methacrylate, acrylic acid, methacrylic acid, itaconic acid, acrylamide, N-substituted acrylamide or methacrylamide, maleic anhydride, maleimide, N-alkyl, aryl or haloaryl substituted maleimide, glycidyl (meth)acrylates, hydroxy alkyl (meth)acrylates or mixtures thereof. The acrylonitrile, substituted acrylonitrile, or acrylic acid esters are described generically by the following formula (VII):

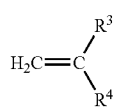

(VII)

wherein $R^3$ is H or $C_1$-$C_6$ alkyl and $R^4$ is selected from the group consisting of cyano and $(C_1$-$C_{16})$alkoxycarbonyl. Examples of such monomers include acrylonitrile, ethacrylonitrile, methacrylonitrile, a-chloroacrylonitrile, a-bromoacrylonitrile, methyl acrylate, methyl methacrylate, ethyl acrylate, butyl acrylate, propyl acrylate, isopropyl acrylate and mixtures thereof. The preferred monomer is acrylonitrile and the preferred acrylic acid esters are ethyl acrylate and methyl methacrylate. It is also preferred that the acrylic acid esters, when included, are employed in combination with styrene or acrylonitrile.

The rubber modified graft copolymer preferably comprises (i) the rubber substrate, and (ii) a rigid polymeric superstrate portion grafted to the rubber substrate. The rubber substrate is preferably present in the graft copolymer at a level of from about 5% to about 80% by weight, based on the total weight of the graft copolymer, more preferably from about 10% to about 70% by weight thereof. The rigid superstrate is preferably present at a level of from about 95% to about 20% based on the total weight of the graft copolymer, and more preferably from about 90% to about 30% by weight thereof.

Examples of rubbery polymers for the substrate include: conjugated dienes, copolymers of a diene with styrene, acrylonitrile, methacrylonitrile or $(C_1$-$C_8)$alkyl acrylate which contain at least about 50% (preferably at least about 65% by weight) conjugated dienes, polyisoprene or mixtures thereof; olefin rubbers, that is, ethylene propylene copolymers (EPR) or ethylene propylene non-conjugated diene copolymers (EPDM); silicone rubbers; or $(C_1$-$C_8)$alkyl acrylate homopolymers or copolymers with butadiene and/or styrene. The acrylic polymer may also contain up to 5% of one or more polyfunctional crosslinking agents such as alkylenediol di(meth)acrylates, alkylenetriol tri(meth)acrylates, polyester di(meth)acrylates, divinylbenzene, trivinylbenzene, butadiene, isoprene and optionally graftable monomers such as, triallyl cyanurate, triallyl isocyanurate, allyl (meth)acrylate, diallyl maleate, diallyl fumarate, diallyl adipate, triallyl esters of citric acid or mixtures of these agents.

The diene rubbers may preferably be polybutadiene, polyisoprene and copolymers of butadiene with up to 35% by weight of $(C_1$-$C_6)$alkylacrylate which are produced by aqueous radical emulsion polymerization. The acrylate rubbers may be cross-linked, particulate emulsion copolymers substantially of $(C_1$-$C_8)$alkylacrylate, in particular $(C_1$-$C_6)$alkylacrylate, optionally in admixture with up to 15% by weight of comonomers such as styrene, methylmethacrylate, butadiene, vinyl methyl ether or acrylonitrile and optionally up to 5% by weight of a polyfunctional crosslinking comonomer, for example, divinylbenzene, glycolbis-acrylates, bisacrylamides, phosphoric acid triallylester, citric acid triallyl-ester, allylesters or acrylic acid or methacrylic acid, triallylcyanurate, triallylisocyanurate. Also suitable are mixtures of diene and alkylacrylate rubbers and rubbers which have a so-called core/shell structure, for example a core of diene rubber and a shell of acrylate or vice versa.

Specific conjugated diene monomers normally utilized in preparing the rubber substrate of the graft polymer are generically described by the following formula (VIII):

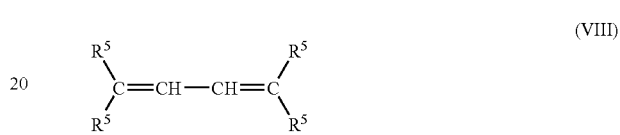

(VIII)

wherein each $R_5$ is independently H, $(C_1$-$C_6)$alkyl, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3 butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion must exhibit a glass transition temperature (Tg) of less than about 0° C.

Mixtures of one or more rubbery polymers previously described for preparing the monovinylidene aromatic graft polymers, or mixtures of one or more rubber modified monovinylidene aromatic graft polymers disclosed herein may also be employed. Furthermore, the rubber may comprise either a block or random copolymer. The rubber particle size used in this invention as measured by simple light transmission methods or capillary hydrodynamic chromatography (CHDF) may be described as having an average particle size by weight of 0.05 to 1.2 microns, preferably 0.2 to 0.8 microns, for emulsion based polymerized rubber latices or 0.5 to 10 microns, preferably 0.6 to 1.5 microns, for mass polymerized rubber substrates which also have included grafted monomer occulsions. The rubber substrate is preferably a particulate, moderately cross-linked diene or alkyl acrylate rubber, and preferably has a gel content greater than 70%.

Preferred graft superstrates include copolymers of styrene and acrylonitrile, copolymers of a-methylstyrene and acrylonitrile and methylmethacrylate polymers or copolymers with up to 50% by weight of $(C_1$-$C_6)$alkylacrylates, acrylonitrile or styrene. Specific examples of monovinylidene aromatic graft copolymers include but are not limited to the following: acrylonitrile-butadiene-styrene (ABS), acrylonitrile-styrene-butyl acrylate (ASA), methylmethacrylate-acrylonitrile-butadiene styrene (MABS), acrylonitrile-ethylene-propylene-non-conjugated diene-styrene (AES).

The ungrafted rigid polymers (typically free of rubber) are resinous, thermoplastic polymers of styrene, a-methylstyrene, styrenes substituted in the nucleus such as paramethylstyrene, methyl acrylate, methylmethacrylate, acrylonitrile, methacrylonitrile, maleic acid anhydride, N-substituted maleimide, vinyl acetate or mixtures thereof. Styrene/acrylonitrile copolymers, a-methylstyrene/acrylonitrile copolymers and methylmethacrylate/acrylonitrile copolymers are preferred.

The ungrafted rigid copolymers are known and may be prepared by radical polymerization, in particular by emulsion, suspension, solution or bulk polymerization. They preferably have number average molecular weights of from about 20,000 to about 200,000 g/mol and limiting viscosity numbers [η] of from about 20 to about 110 ml/g (determined in dimethylformamide at 25° C.).

The number average molecular weight of the grafted rigid superstrate of the monovinylidene aromatic resin is designed to be in the range of about 20,000 to about 350,000 g/mol. The ratio of monovinylidene aromatic monomer to the second and optionally third monomer may is range from 90/10 to 50/50 preferably 80/20 to 60/40. The third monomer may optional replace 0 to 50 percent of one or both of the first and second monomers.

These rubber modified monovinylidene aromatic graft polymers may be polymerized either by mass, emulsion, suspension, solution or combined processes such as bulk-suspension, emulsion-bulk, bulk-solution or other techniques well known in the art. Furthermore, these rubber modified monovinylidene aromatic graft copolymers may be produced either by continuous, semibatch or batch processes.

Flame Retardant

The resin used for the pallets of the present invention may also comprise at least one flame retardant, generally a halogenated material, an organic phosphate, or a combination of the two. For resin compositions containing polyphenylene ether or polycarbonate resin, the organic phosphate class of materials are generally preferred. The organic phosphate is preferably an aromatic phosphate compound of the formula (IX):

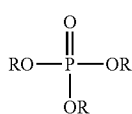

(IX)

where R is the same or different and is alkyl, cycloalkyl, aryl, alkyl substituted aryl, halogen substituted aryl, aryl substituted alkyl, halogen, or a combination of any of the foregoing, provided at least one R is aryl.

Examples include phenyl bisdodecyl phosphate, phenyl-bisneopentyl phosphate, phenyl-bis(3,5,5'-tri-methyl-hexyl phosphate), ethyldiphenyl phosphate, 2-ethyl-hexyldi(p-tolyl) phosphate, bis-(2-ethylhexyl) p-tolylphosphate, tritolyl phosphate, bis-(2-ethylhexyl) phenyl phosphate, tri-(nonylphenyl) phosphate, di(dodecyl) p-tolyl phosphate, tricresyl phosphate, triphenyl phosphate, dibutylphenyl phosphate, 2-chloroethyldiphenyl phosphate, p-tolyl bis(2, 5,5'-trimethylhexyl) phosphate, 2-ethylhexyldiphenyl phosphate, and the like. The preferred phosphates are those in which each R is aryl. Especially preferred is triphenyl phosphate, which may be either unsubstituted or substituted, for example, isopropylated triphenyl phosphate.

Alternatively, the organic phosphate can be a di- or polyfunctional compound or polymer having the formula (X), (XI), or (XII) below:

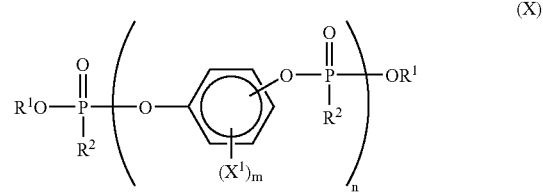

(X)

or

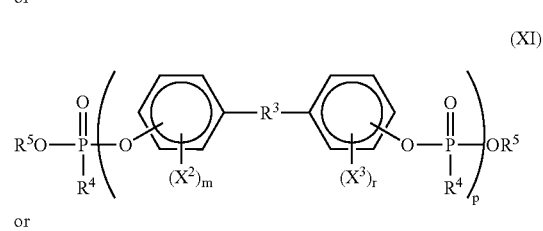

(XI)

or

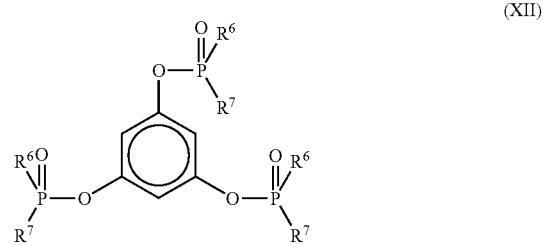

(XII)

including mixtures thereof, in which $R^1$, $R^3$ and $R^5$ are, independently, hydrocarbon; $R^2$, $R^4$, $R^6$ and $R^7$ are, independently, hydrocarbon or hydrocarbonoxy; $X^1$, $X^2$ and $X^3$ are halogen; m and r are 0 or integers from 1 to 4, and n and p are from 1 to 30.

Examples include the bis diphenyl phosphates of resorcinol, hydroquinone and bisphenol-A, respectively, or their polymeric counterparts.

Methods for the preparation of the aforementioned di- and polyfunctional aromatic phosphates are described in British Patent No. 2,043,083.

Another development is the use of certain cyclic phosphates, for example, diphenyl pentacrytfiritol diphosphate, as a flame retardant agent for polyphenylene ether resins, as is described by Axelrod in U.S. Pat. No. 4,154,775.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl) phosphine oxide, or tetrakis(hydroxymethyl) phosphonium chloride. These flame-retardant additives are commercially available.

Preferred phosphate flame retardants include those based upon resorcinol such as, for example, resorcinol tetraphenyl diphosphate, as well as those based upon bis-phenols such as, for example, bis-phenol A tetraphenyl diphosphate. Phosphates containing substituted phenyl groups are also preferred. In an especially preferred embodiment, the organophosphate is selected from the group consisting of butylated triphenyl phosphate ester, resorcinol tetraphenyl diphosphate, bis-phenol A tetraphenyl diphosphate, and mixtures containing at least one of the foregoing.

The flame retardant is present in at least the minimum amount necessary to impart a degree of flame retardancy to the composition to pass the UL 2335 protocol for pallets. The particular amount will vary, depending on the molecular weight of the organic phosphate, the amount of the flammable resin present and possibly other normally flammable ingredients which might also be included in the composition.

For compositions comprising polyphenylene ether resin, preferred compositions have the major components which make up the composition in an amount within the following preferred ranges:

Polyphenylene ether resin, (a) about 30 to about 70 parts;
Non-elastomeric polymer of an alkenylaromatic compound, (b) about 20 to about 60 parts; and
Organic phosphate, (c) about 10 to about 30 parts;
based on 100 parts by weight of (a), (b), and (c) together.

Halogenated materials are also a useful class of flame retardants. These materials are preferably aromatic halogen compounds and resins of the formula (XIII):

(XIII)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, etc.; a linkage selected from the group consisting of ether oxygen ether; carbonyl; amine; a sulfur containing linkage, e.g., sulfide, sulfoxide, sulfone; a phosphorus containing linkage; etc. R can also consist of two or more alkylene or alkylidene linkages connected by such groups as aromatic, amino, ether, carbonyl, sulfide, sulfoxide, sulfone, a phosphorus containing linkage, etc. Other groups which are represented by R will occur to those skilled in the art, including those found in U.S. Pat. Nos. 4,692,490 and 4,191,685.

Ar and Ar' are mono- or polycarbocyclic aromatic groups such as phenylene, biphenylene, terphenylene, naphthylene, etc. Ar and Ar' may be the same or different.

Y is a substituent selected from the group consisting of organic, inorganic or organometallic radicals. The substituents represented by Y include (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl nucleus.

X is a monovalent hydrocarbon group exemplified by the following: alkyl, such as methyl, ethyl, propyl, isopropyl, butyl, decyl, etc; aryl groups, such as phenyl, naphthyl, biphenyl, xylyl, tolyl, etc; aralkyl groups such as benzyl, ethylphenyl, etc.; cycloaliphatic groups, such as cyclopentyl, cyclohexyl, etc.; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are biphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dichromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane 2,2 bis-(3-bromo-4-hydroxyphenyl)-propane.

The preparation of these and other applicable bisphenols is known in the art. They are most commonly prepared by condensation of two moles of a phenol with a single mole of a ketone or aldehyde. In place of the divalent aliphatic group in the above examples may be substituted oxygen, sulfur sulfoxy, etc.

Included within the above structural formula are: 1,3-dichlorobenzene, 1,4-dibrombenzene, 1,3-dichloro-4-hydroxybenzene and biphenyls such as 2,2'-dichlorobiphenyl, polybrominated 1,4-diphenoxybenzene, 2,4'-dibromobiphenyl, and 2,4'-dichlorobiphenyl as well as decabromo modiphenyl oxide, and the like.

Also useful are oligomeric and polymeric halogenated aromatic compounds, such as, for example, a copolycarbonate of bisphenol A and tetrabromobisphenol A and a carbonate precursor, e.g., phosgene. Metal synergists, e.g., antimony oxide, may also be used with the flame retardant.

Polyetherimide Resin and Blends Containing Polyetherimide Resin

The polyetherimide resins useful with the present invention are known compounds whose preparation and properties are described in U.S. Pat. Nos. 3,803,085 and 3,905,942, each of which is incorporated herein by reference.

Preferably, the polyetherimide used for preparing the blends of this invention comprises more than 1, typically from about 10 to 1000 or more, and more preferably from about 10 to about 500 structural units, of the formula (XIV):

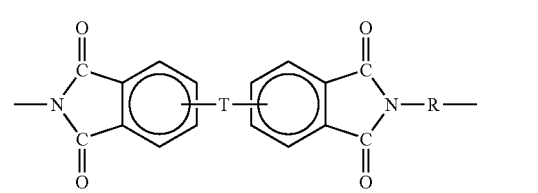

(XIV)

wherein T is —O— or a group of the formula —O-Z-O— wherein the divalent bonds of the —O— or the —O-Z-O— group are in the 3,3', 3,4', 4,3', or the 4,4' positions; Z includes, but is not limited to, a divalent radical of formulae (XV):

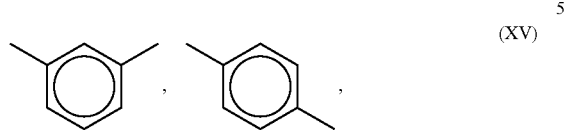

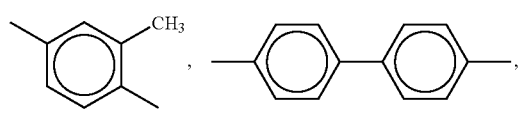

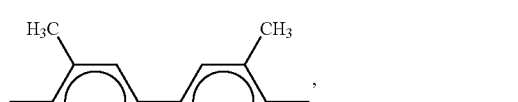

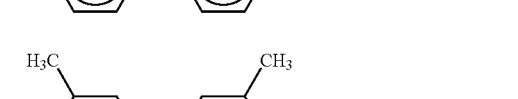

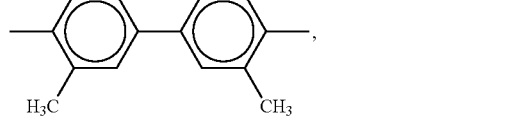

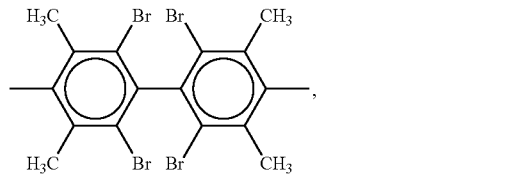

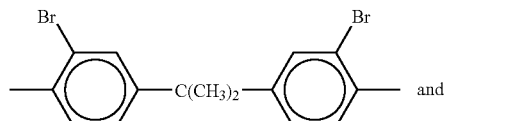

wherein X includes, but is not limited to, divalent radicals of the formulae (XVI):

wherein y is an integer from 1 to about 5, and q is 0 or 1; R includes, but is not limited to, a divalent organic radical: (a) aromatic hydrocarbon radicals having from 6 to about 20 carbon atoms and halogenated derivatives thereof, (b) alkylene radicals having from about 2 to about 20 carbon atoms, (c) cycloalkylene radicals having from about 3 to about 20 carbon atoms, and (d) divalent radicals of the general formula (XVII):

where Q includes, but is not limited to, the formulae (XVIII):

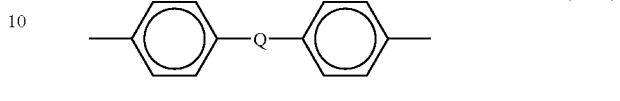

where y is an integer from about 1 to about 5.

In one embodiment, the polyetherimide may be a copolymer which, in addition to the etherimide units described above, further contains polyimide structural units of the formula (XIX):

wherein R is as previously defined for formula (XIV) and M includes, but is not limited to, formulas (XX), (XXI), and (XII):

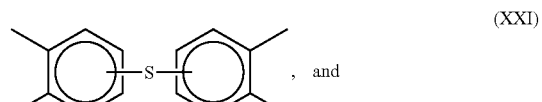

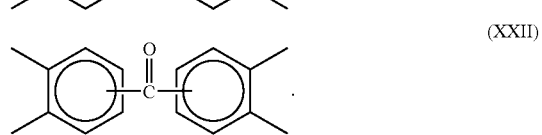

The polyetherimide can be prepared by any of the methods well known to those skilled in the art, including the reaction of an aromatic bis(ether anhydride) of the formula (XXIII):

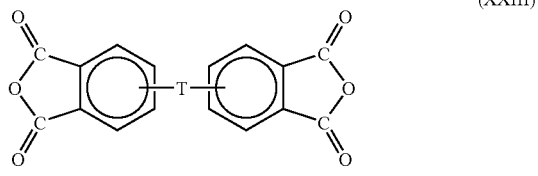

(XXIII)

with an organic diamine of the formula (XXIV):

$$H_2N—R—NH_2 \qquad (XXIV)$$

wherein T and R are defined as described above in formula (XIV). In general the reactions can be carried out employing well-known solvents, e.g., o-dichlorobenzene, m-cresol/toluene and the like to effect interaction between the anhydride of formula (XXIII) and the diamine of formula (XXIV), at temperatures of about 100° C. to about 250° C. Alternatively, the polyetherimide can be prepared by melt polymerization of aromatic bis(ether anhydride)s and diamines accomplished by heating a mixture of the ingredients to elevated temperatures with concurrent stirring. Generally melt polymerizations employ temperatures of about 200° C. to about 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated herein by reference.

Illustrative examples of aromatic bis(ether anhydride)s of formula (XXIII) include: 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

A preferred class of aromatic bis(ether anhydride)s included by formula (XXIII) above includes, but is not limited to, compounds wherein T is of the formula (XXV):

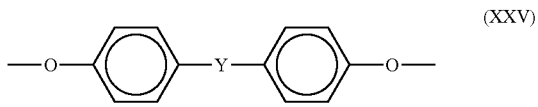

(XXV)

and the ether linkages, for example, are preferably in the 3,3', 3,4', 4,3', or 4,4' positions, and mixtures thereof, and where Y includes, but is not limited to the formulae (XXVI):

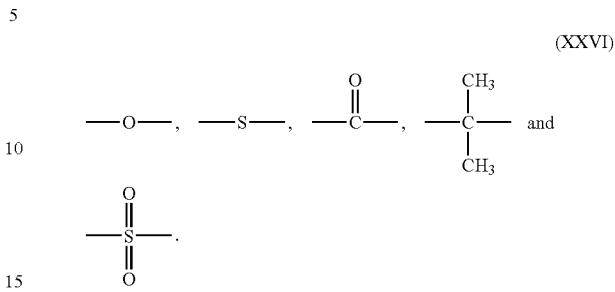

(XXVI)

When polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (XXIV) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl)ether; bis(p-beta-methyl-o-aminophenyl)benzene; 1,3-diamino-4-isopropylbenzene; 1,2-bis(3-aminopropoxy)ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Generally, useful polyetherimides have a melt index of between 0.1 and 10 grams per minute ("g/min"), as measured by American Society for Testing Materials ("ASTM") D1238 at 337° C., using a 6.6 kilogram ("kg") weight.

In a preferred embodiment, the polyetherimide resin of the present invention resin has a weight average molecular weight of from 10,000 to 150,000 grams per mole ("g/mole"), as measured by gel permeation chromatography, using a polystyrene standard. Such polyetherimide resins typically have an intrinsic viscosity [η] greater than about 0.2 deciliters per gram, preferably about 0.35 to about 0.7 deciliters per gram measured in m-cresol at 25° C.

Included among the many methods of making the polyetherimide are those disclosed in U.S. Pat. Nos. 3,847,867, 3,847,869, 3,850,885, 3,852,242, 3,855,178, and 3,983,093. These patents are incorporated herein by reference for the purpose of teaching, by way of illustration, general and specific methods for preparing palyetherimide for use in the blends of this invention.

In a preferred embodiment, the polyetherimide resin comprises structural units according to formula (XIV) wherein each R is independently paraphenylene or metaphenylene and T is a divalent radical of the formula (XXVII):

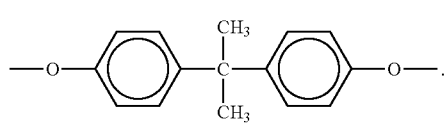

(XXVII)

The polyetherimide resins may be used alone or as blends with other resins. The other resin, when one is used, may be selected from the group consisting of polycarbonate resins, polyester resins, polyphenylene ether resins, polyarylene sulfide resins, polyetherimide-siloxane copolymer resins, and polysulfone resins.

The composition can be further modified, if desired, by including one or more additives often used with thermoplastic polymers, some of which may serve to beneficially affect the chemical and physical properties. Examples are mineral fillers, including clay, reinforcing agents, for example, glass fibers, flakes or spheres, plasticizers, flame retardants, stabilizers, antioxidants, colorants, processing aids, and so forth.

The resin compositions used in the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be pre-compounded with each other. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

Thermosetting Resins

The thermosetting resins useful with the present invention are known materials whose preparation and properties are described in, for example, Jean-Michel Charrier, *Polymeric Materials and Processing* (Hanser Publishers 1990) and Kirk-Othmer, *Encyclopedia of Chemical Technology* (John Wiley & Sons 1991).

Useful thermosetting resins are selected from the group consisting of epoxy, phenolic, alkyds, allyl, formaldehyde, furan, polyester, polyimide, polyurethane, mineral filled silicone, bis-maleimides, cyanate esters, vinyl, and benzocyclobutene resins. Mixtures of two or more thermosetting resins may also be employed. Resins produced by partial curing of cyanate esters are well known. Such resins, referred to as upstaged resins, may also be used in this invention.

Curable thermosetting compositions of this invention generally contain a catalyst known in the art present in quantities effective for curing the composition. The effective amount may vary widely but is ordinarily about 0.5% to about 10.0% and preferably, about 1% to about 5% based on the total weight of the thermosetting resin as described in the art.

Also present in the curable compositions may be materials such as flame retardant synergists such as antimony pentoxide; antioxidants, thermal and ultraviolet stabilizers, lubricants, anti-static agents, dyes, pigments and the like, all in conventional proportions.

It should be clear that improved pallets prepared by the method of the present invention represent an additional embodiment of this invention.

All patents cited by reference are incorporated by reference herein.

The following examples are provided to illustrate some embodiments of the present invention. They are not intended to limit the invention in any aspect. All percentages are by weight based on the total weight of the entire composition, unless otherwise indicated.

Experimental

Resin compositions containing PPE are provided to illustrate part of the embodiments of the present invention. In the examples the following materials have been used:

PPE: a poly(2,6-dimethyl-1,4-phenylene ether) with an intrinsic viscosity of 46 ml/g as measured in toluene at 25° C. and a concentration of 0.6 gram per 100 ml;

HIPS: high impact polystyrene available from Huntsman as grade 1897;

FR: Butylated triphenyl phosphate ester (containing 40-45% triphenyl phosphate) commercially available from Akzo Chemicals as grade Phosflex 71B, and from FMC Corporation as grade Kronitex 50;

LLDPE: linear low density polyethylene commercially available from Exxon Chemical as grade Escorene LL-5502.9, Union Carbide Chemicals as grade LLDPE 8320;

SBS: polystyrene-polybutadiene-polystyrene copolymer available from Shell Chemical Company as grade Kraton D1101-12; B&M Plastics as KD 1101-12;

TDP tridecyl phosphite;

AO hindered phenol anitoxidant commercially available from Ciba-Geigy as Irganox 1010;

ZnO zinc oxide;

ZnS zinc sulfide

The ingredients were compounded in the weight ratios as indicated in the following table in a twin-screw extruder with temperature settings over the length of the extruder between about 280 and about 310° C. The screw speed was 300 rpm, the throughput 10 kilograms per hour. All ingredients were fed at the throat of the extruder. The strands coming from the extruder were pelletized and dried for about 3 hours at about 110° C. The dried pellets were injection molded into standard ASTM test specimens for measurement of physical properties.

TABLE 1

| | Sample | | | | |
|---|---|---|---|---|---|
| | 1 | 2 | 3 | 4 | 5 |
| PPE | 50 | 42 | 59.07 | 45.87 | 50 |
| HIPS | 50 | 58 | 34.72 | 45.87 | 39.29 |
| 71B | 0 | 0 | 6.21 | 8.26 | 10.71 |
| LLDPE | 1.5 | 1.5 | 1.5 | 1.5 | 1.5 |
| SBS | 0 | 2 | 3.5 | 2 | 2 |
| AO | 0 | 0.5 | 0.5 | 0.5 | 0.5 |
| ZnO | 0 | 0.16 | 0.16 | 0.15 | 0.15 |
| ZnS | 0 | 0.16 | 0.16 | 0.15 | 0.15 |
| properties | | | | | |
| ten. str.; psi. | 8769 | 7142 | 8700 | 7923 | 8224 |
| ten. elg., % | 28 | 35 | 25 | 33 | 33 |
| flex. str., psi | 12650 | 10306 | 13620 | 11551 | 11110 |
| n. Izod, ft-lb/in | 4.64 | 6.5 | 6.4 | 7.0 | 6.7 |
| Dynatup, ft-lbs | — | 35 | — | 39 | 39 |
| Flow, 580/190° F. | 17 | 20.8 | 19.2 | 20.2 | 20.5 |
| HDT, 264 psi | 260 | 244 | 243 | 234 | 231 |

Pallets were molded from the compositions and tested according to the UL 2335 protocol. Sample 5 met the Class II Commodity test with an overall rank average of about 2.0. Pallets were also tested in the idle pallet storage test as compared to oak stringer and wood 9-block pallets. The results are found in Table 2.

TABLE 2

| Product | sprinklers activated | radiometer | steel beam average temperature | fire spread? |
|---|---|---|---|---|
| Sample 5 | 4 | 2 | <150° F. | no |
| oak stringer | 7 | 14 | 315° F. | no |
| wood 9-block | 13 | 9 | 201° F. | yes |

As seen by the data contained in Table 2, sample 5 unexpectedly outperformed both the oak stringer pallet and the wood 9-block pallet in the UL stacked idle storage test in the number of sprinklers activated (fewer is desired), the radiometer (a lower number is preferred), the average steel beam temperature (lower is better) and with little to no fire spread. Commercial pallets made from polyethylene resin fail to meet the UL testing protocol.

What is claimed is:

1. A plastic pallet comprising:
   a polyphenylene ether resin;
   a rubber-modified polystyrene; and
   at least one flame retardant in an amount sufficient to impart a degree of flame retardancy to the pallet to pass UL 2335 protocol for pallets, wherein the at least one flame retardant is present in about 10 to about 30 parts based on 100 parts by weight of the polyphenylene ether resin, polystyrene resin and flame retardant together;
   wherein the pallet is suitable for commodity storage and meets or exceeds Underwriters Laboratory UL 2335 protocol for pallets; and
   wherein the plastic pallet comprises both a top deck and a bottom deck.

2. The plastic pallet of claim 1, wherein the flame retardant is an organophosphate.

3. The plastic pallet of claim 2, wherein the organophosphate is an aromatic phosphate compound of the formula $$RO-\underset{\underset{OR}{|}}{\overset{\overset{O}{\|}}{P}}-OR$$

where R is the same or different and is alkyl, cycloalkyl, aryl, alkyl substituted aryl, halogen substituted aryl, aryl substituted alkyl, halogen, or a combination of any of the foregoing, provided at least one R is aryl.

4. The plastic pallet of claim 1, further comprising an impact modifier.

5. The plastic pallet of claim 1, further comprising at least one additive, wherin the additive is selected from the group consisting of mineral filler, clay, reinforcing agent, glass fiber, glass flakes, glass spheres, plasticizer, stabilizer. colorant, processing aids, and a combination of the foregoing additives.

6. The plastic pallet of claim 1, wherein the pallet comprises.
   about 30 to about 70 parts of the polyphenylene ether resin,
   about 20 to about 60 parts of the polystyrene resin, and
   about 10 to about 30 parts of the flame retardant, wherein all weights are based on 100 parts by weight of the polyphenylene ether resin, polystyrene resin and flame retardant together.

7. A plastic pallet consisting of:
   a polyphenylene ether resin;
   a high impact polystyrene;
   at least one flame retardant in an amount sufficient to impart a degree of flame retardancy to the pallet to pass UL 2335 protocol for pallets, wherein the at least one flame retardant is present in about 10 to about 30 parts based on 100 parts by weight of the polyphenylene ether resin, polystyrene resin and flame retardant together; and
   at least one impact modifier,
   wherein the pallet is suitable for commodity storage and meets or exceeds Underwriters Laboratory UL 2335 protocol for pallets; and
   wherin the plastic pallet comprises both a top deck and a bottom deck.

8. A method for making a plastic pallet comprising:
   injection molding a composition comprising polyphenylene ether resin; a rubber-modifided polystyrene; and at least one flame retardant in an amount necessary to impact a degree of flame retardancy to the pallet to pass the UL 2335 protocol for pallets, wherein the at least one flame retardant is present in about 10 to about 30 parts based on 100 parts by weight of the polyphenylene ether resin, polystyrene resin and flame retardant together; wherein the pallet is suitable for commodity storage and meets or exceeds Underwriters Laboratory UL 2335 protocol for pallets; and wherin the plastic pallet comprises both a top and a bottom deck.

9. The plastic pallet of claim 1, wherein the top deck, the bottom deck or both the top and bottom decks contain holes.

10. The plastic pallet of claim 1, wherein the plastic pallet is 48"×40".

11. The plastic pallet of claim 1, wherein the plastic pallet has a load capacity of 2,800 pounds.

12. The plastic pallet of claim 1, wherein the plastic pallet is capable of bearing 2,800 pound loads in stacks of 5 loads high racking.

13. The plastic pallet of claim 1, wherein the plastic pallet can accommodate pallet jacks.

14. The plastic pallet of claim 1, wherein the plastic pallet meets the Grocery Manufacturing Association specifications.

* * * * *

UNITED STATES PATENT AND TRADEMARK OFFICE
CERTIFICATE OF CORRECTION

PATENT NO. : 7,273,014 B2
APPLICATION NO. : 10/771784
DATED : September 25, 2007
INVENTOR(S) : Adedeji et al.

It is certified that error appears in the above-identified patent and that said Letters Patent is hereby corrected as shown below:

Column 3:
Line 8, after "all" delete "pallots" and insert therefor -- pallets --
Line 13, before "commonly" and insert -- co-pending --

Column 4:
Line 12, after "halogen;" delete "z" and insert therefor -- Z --
Line 16, after "butadiene" delete "u" and insert therefor -- α --

Column 22:
Line 61, after "top" insert -- deck --

Signed and Sealed this

Twentieth Day of May, 2008

JON W. DUDAS
*Director of the United States Patent and Trademark Office*